US012766793B2

(12) United States Patent
Anahid et al.

(10) Patent No.: US 12,766,793 B2
(45) Date of Patent: Oct. 20, 2026

(54) HEAT DISSIPATION CONTROL IN ADDITIVE MANUFACTURING

(71) Applicant: RTX Corporation, Farmington, CT (US)

(72) Inventors: Masoud Anahid, Galena, OH (US); Sergei Burlatsky, West Hartford, CT (US); David Furrer, Marlborough, CT (US); Jingfu Liu, Prior Lake, MN (US)

(73) Assignee: RTX Corporation, Farmington, CT (US)

( * ) Notice: Subject to any disclaimer, the term of this patent is extended or adjusted under 35 U.S.C. 154(b) by 157 days.

(21) Appl. No.: 18/785,826

(22) Filed: Jul. 26, 2024

(65) Prior Publication Data

US 2026/0027778 A1 Jan. 29, 2026

(51) Int. Cl.
*B22F 10/25* (2021.01)
*B22F 10/28* (2021.01)
(Continued)

(52) U.S. Cl.
CPC .......... *B29C 64/371* (2017.08); *B29C 64/153* (2017.08); *B29C 64/393* (2017.08);
(Continued)

(58) Field of Classification Search
CPC .. B08B 5/04; B22F 10/25; B22F 10/28; B22F 10/36; B22F 10/366; B22F 10/85;
(Continued)

(56) References Cited

U.S. PATENT DOCUMENTS 10,252,508 B2 4/2019 Burlatsky et al.
10,252,509 B2 4/2019 Burlatsky et al.
(Continued)

FOREIGN PATENT DOCUMENTS

CN 116511526 A 8/2023
EP 3354381 A1 8/2018
(Continued)

OTHER PUBLICATIONS

Riensche Alex et al: "Feedforward control 1-6,9,10 INV. of thermal history in laser powder bed B22F10/28 fusion: Toward physics-based optimization B22F10/322 of processing parameters", B22F10/368 Materials & Design, Elsevier, Amsterdam, B22F10/38 NL, B22F12/20 vol. 224, Nov. 15, 2022 (Nov. 15, 2022).
(Continued)

*Primary Examiner* — Leo B Tentoni
(74) *Attorney, Agent, or Firm* — Kinney & Lange

(57) ABSTRACT

A method of making a part using an additive manufacturing (AM) process includes making, with an AM process, one or more parts and applying a heat dissipation technique to the one or more parts during performance of the AM technique to mitigate temperature build-up in the one or more parts. The heat dissipation technique is applied to keep temperature at a top of a part build at or below a Threshold Temperature ($T_{th}$), which is a temperature above which keyhole porosity forms in the one or more parts. The heat dissipation technique includes one or more of a height-dependent pause, a variable interlayer pause time, temperature-graded inert gas control, and guided pressurized cool inert gas.

13 Claims, 9 Drawing Sheets

(51) Int. Cl.

| | |
|---|---|
| ***B22F 10/36*** | (2021.01) |
| ***B22F 10/366*** | (2021.01) |
| ***B22F 10/85*** | (2021.01) |
| ***B29C 64/153*** | (2017.01) |
| ***B29C 64/171*** | (2017.01) |
| ***B29C 64/176*** | (2017.01) |
| ***B29C 64/182*** | (2017.01) |
| ***B29C 64/371*** | (2017.01) |
| ***B29C 64/393*** | (2017.01) |
| ***F26B 5/12*** | (2006.01) |
| ***F26B 9/00*** | (2006.01) |
| *B29L 31/08* | (2006.01) |
| *B29L 31/30* | (2006.01) |
| *B33Y 10/00* | (2015.01) |
| *B33Y 50/02* | (2015.01) |
| *B33Y 80/00* | (2015.01) |

(52) U.S. Cl.

CPC ... *B29L 2031/08* (2013.01); *B29L 2031/3076* (2013.01); *B33Y 10/00* (2014.12); *B33Y 50/02* (2014.12); *B33Y 80/00* (2014.12)

(58) Field of Classification Search

CPC ... B29C 64/153; B29C 64/171; B29C 64/176; B29C 64/182; B29C 64/393; B33Y 10/00; B33Y 50/02; F26B 5/12; F26B 9/00

USPC ........ 264/40.1, 237, 297.1, 297.8, 308, 461, 264/497; 219/121.17, 121.3, 121.33, 219/121.35, 121.62, 121.66, 121.81, 219/121.85; 134/21; 34/92, 403

See application file for complete search history.

(56) References Cited

U.S. PATENT DOCUMENTS

| | | | | |
|---|---|---|---|---|
| 10,252,510 | B2 | 4/2019 | Burlatsky et al. | |
| 10,252,511 | B2 | 4/2019 | Burlatsky et al. | |
| 10,252,512 | B2 | 4/2019 | Burlatsky et al. | |
| 10,254,730 | B2 | 4/2019 | Burlatsky et al. | |
| 10,888,924 | B2 | 1/2021 | Burlatsky et al. | |
| 10,974,444 | B1 | 4/2021 | Ahmed | |
| 11,097,350 | B2 | 8/2021 | Twelves et al. | |
| 11,531,920 | B2 | 12/2022 | Anahid et al. | |
| 11,885,000 | B2 | 1/2024 | Chaudhury | |
| 2015/0266242 | A1 * | 9/2015 | Comb | B29C 64/393 264/40.1 X |
| 2017/0059163 | A1 * | 3/2017 | Ott | B23P 6/007 |
| 2018/0356778 | A1 | 12/2018 | Acharya et al. | |
| 2020/0376550 | A1 | 12/2020 | Burlatsky et al. | |
| 2021/0046519 | A1 * | 2/2021 | Go | B08B 5/04 |
| 2022/0371097 | A1 | 11/2022 | Greenfield et al. | |
| 2024/0227014 | A1 | 7/2024 | Calefati et al. | |

FOREIGN PATENT DOCUMENTS

| | | | | |
|---|---|---|---|---|
| WO | 2023067701 | A1 | 4/2023 | |
| WO | WO-2024026100 | A2 * | 2/2024 | B29C 64/153 |

OTHER PUBLICATIONS

Extended European Search Report for European Patent Application No. 25192273.8, dated Jan. 7, 2026, 9 pages.

* cited by examiner

HEAT DISSIPATION CONTROL IN ADDITIVE MANUFACTURING

The present disclosure relates generally to additive manufacturing and, more particularly, to a thermal management method for additive manufacturing.

Various additive manufacturing (AM) techniques are widely used to build precision parts relatively quickly. Many AM techniques that use a layer-by-layer build approach, such as laser beam powder bed fusion (PBF-LB) and the related electron beam powder bed fusion (PBF-EB) techniques, can be challenged with temperature build-up from prior layers. Such a challenge is particularly evident when building relatively tall structures or when the build protocol includes relatively short interlayer dwell times. The temperature build-up can increase the risk of keyhole defect formation, which can lead to a failed build campaign.

SUMMARY

One aspect of this disclosure is directed to a method of making a part using an additive manufacturing (AM) process including making, with an AM process, one or more parts and applying a heat dissipation technique to the one or more parts during performance of the AM technique to mitigate temperature build-up in the one or more parts. The heat dissipation technique is applied to keep temperature at a top of a part build at or below a Threshold Temperature (Tth), which is a temperature above which keyhole porosity forms in the one or more parts. The heat dissipation technique includes one or more of a variable height-dependent interlayer pause time, temperature-graded inert gas control, and guided pressurized cool inert gas.

Another aspect of this disclosure is directed to a cool inert gas nozzle system for use in an AM process. The cool inert gas nozzle system includes a central channel configured to release a stream of cool inert gas and an outer channel configured to use a suction to capture build powder particles displaced by the stream of cool inert gas.

BRIEF DESCRIPTION OF THE DRAWINGS

FIG. 5C-1 is graphical representation of interlayer dwell time as a function of build height for two scenarios described in this disclosure.

FIG. 5C-2 is graphical representation comparing interlayer dwell time for a first scenario to dwell time for a second scenario.

DETAILED DESCRIPTION

In additive manufacturing (AM), the challenge of temperature build-up from prior layers can pose a significant hurdle to building structures that conform to quality requirements. This can be particularly true for build campaigns that print tall structures or that include relatively short interlayer dwell times. Even with well-selected AM machine settings, the temperature build-up can elevate the risk of keyhole defect formation, especially toward the upper sections of the build. Applying mitigation techniques (e.g., using lower laser power, etc.) uniformly throughout the build may resolve the issue at the top layers of the build but could introduce lack of fusion defects toward the bottom layers of the build as a result of lower operating temperatures. This disclosure provides a nuanced and adaptive approach to temperature control to address these complexities and provide a uniformly high-quality build across all layers of the AM process.

Figure 1:
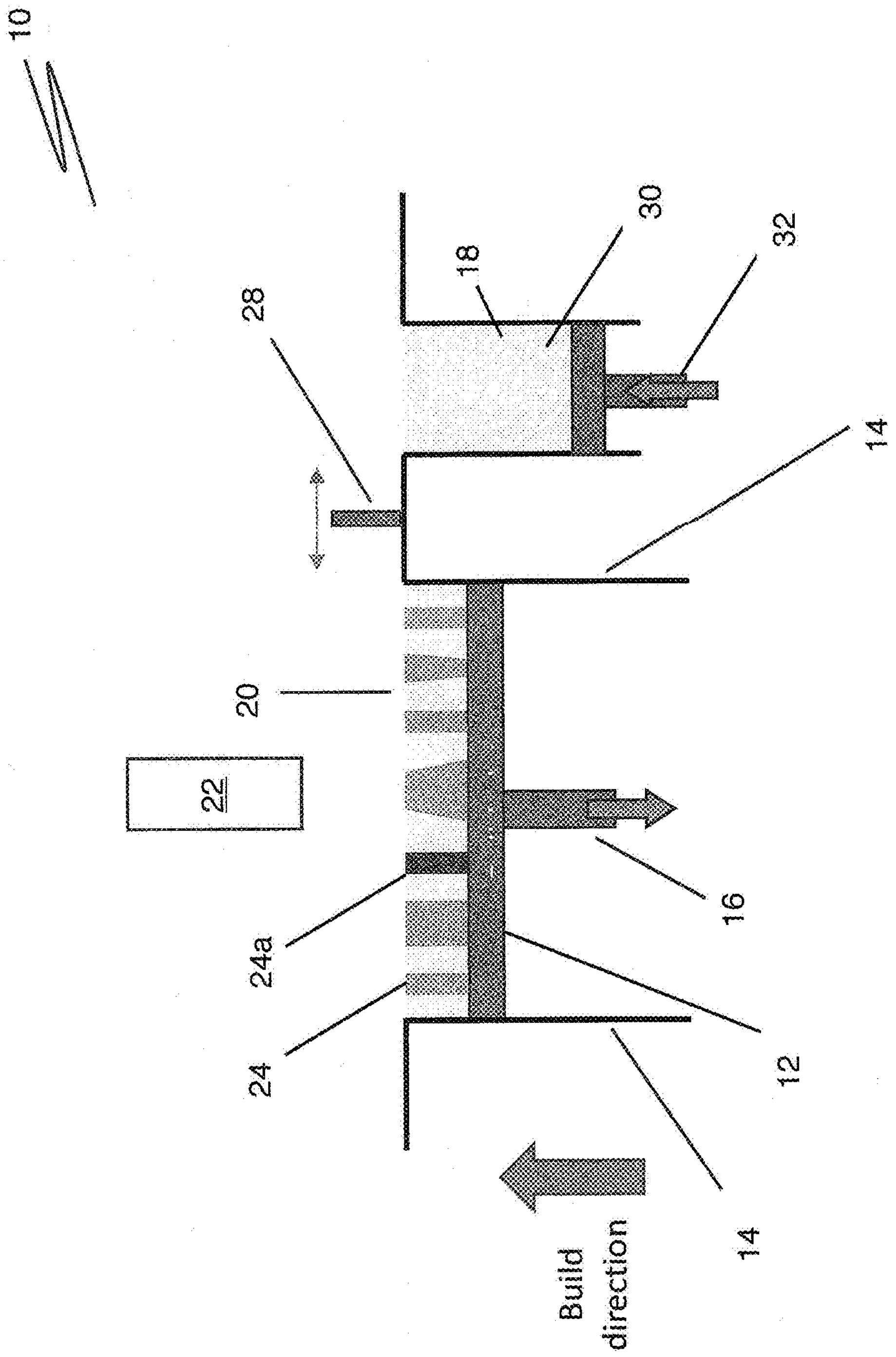
FIG. 1 is a schematic of an additive manufacturing (AM) machine described in this disclosure.

FIG. 1 shows an exemplary laser beam powder bed fusion (PBF-LB) machine 10 that includes a build plate 12 surrounded by walls 14 and positioned on a build piston 16. In operation, the build plate 12 is covered with build powder 18, which is contained within the walls 14 to form a build powder bed 20. An energy source 22, which may include a laser for a PBF-LB machine, an electron beam for a PBF-EB machine, or other suitable energy source, is configured to scan an exposed (i.e., top) surface of the build powder bed 20 to sinter selective portions of the build powder bed 20 to form one or more parts 24, including a part of interest 24*a* for this disclosure, on the build plate 12. Such an operation can be referred to as a build powder scan cycle. After each pass of the energy source 22 over the build powder bed 20, a build piston 16 lowers the build plate 12 a predetermined distance and a recoater 28 spreads a layer of fresh build powder 18 from a build powder reservoir 30 across the build powder bed. A build powder piston 32 in the build powder reservoir 30 is configured to deliver a predetermined amount of build powder to the recoater 28 for distribution across the build powder bed 20.

The time required for (i) the energy source 22 to traverse the entire build powder bed 20, (ii) the build piston 16 to lower the build plate 12, and (iii) the recoater 28 to spread fresh build powder 18 across the build powder bed 20 can be referred to as the interlayer dwell time. The interlayer dwell time for a particular part, such as the part of interest 24*a*, can be expressed with the following equation:

$$t_{d,i}^{part} = t_i^{others} + t_e + t_r \quad \text{(Equation 1)}$$

where:

$t_{d,i}^{part}$:

Interlayer dwell time for the part of interest 24*a* at layer i $t_i^{others}$:

Time to print the $i^{th}$ layer of all other parts 24 in the build $t_e$: The duration the build piston 16 takes to move through one layer thickness $t_r$: The duration required for the recoater 28 to spread the subsequent layer of fresh build powder 18

Figure 2:
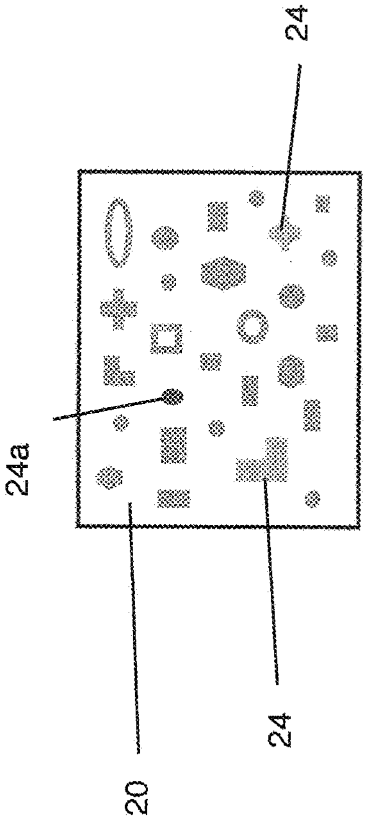
FIG. 2 is a first top view of a powder bed of an AM machine described in this disclosure.
Figure 3:
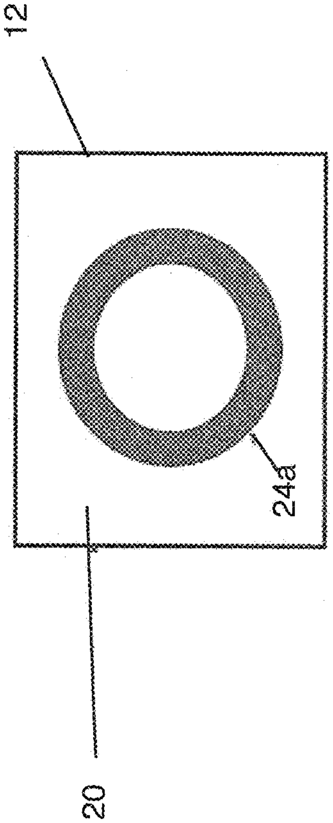
FIG. 3 is a second top view of a powder bed of an AM machine described in this disclosure.

FIGS. 2 and 3 are top views of the build powder bed 20 positioned on build plate 12 that includes the parts 24, including the part of interest 24*a*, to be built during a particular build campaign. The part 24*a* of FIG. 3 is shown to be particularly large compared to the dimensions of the build plate 12 and build powder bed 20.

The interlayer dwell time as defined above is an important factor in understanding and defining AM build techniques, including PBF-LB and PBF-EB techniques. Short interlayer dwell times are prone to occur when the time to print a layer of the part of interest 24*a*, $$t_i^{part},$$

is significantly longer than the time to print the corresponding layers for all other parts 24, $$t_i^{others}.$$

Figure 4:
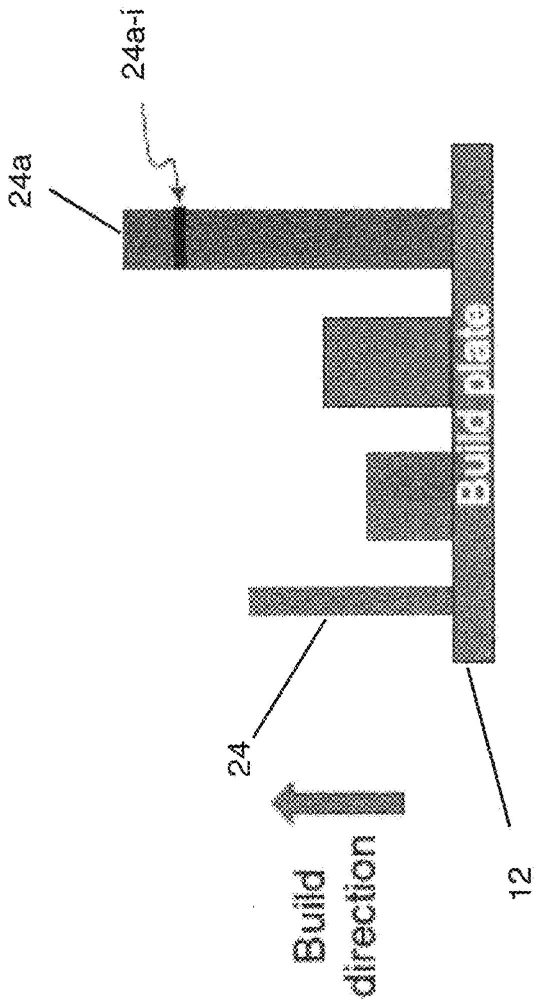
FIG. 4 is a schematic of parts of various heights on a AM machine build plate.

This situation may arise when the part of interest 24*a* is large enough to occupy most of the build plate 12 (see FIG. 3) or when multiple parts 24 with varying heights are printed simultaneously, resulting in a shorter interlayer dwell times for the part of interest 24*a* at the top of the build (see FIG. 4 in which part of interest 24*a* is the tallest part in the build). This occurs because $$t_i^{others}$$

(i.e., the build time other parts for the $i^{th}$ layer 24*a-i*) becomes comparatively smaller (or even zero) than $$t_i^{part}$$

(i.e., the build time for the part of interest 24*a* for the $i^{th}$ layer 24*a-i*), leading to a quicker transition between successive build powder layers.

The challenge of mitigating temperature build-up in such cases makes the use of heat dissipation techniques desirable. The required amount of heat dissipation varies from layer to layer of the build powder bed 20 due to the interplay of height and cross-section characteristics (e.g., for parts with variable cross-sections) of the parts 24, including the part of interest 24*a*, being built during a particular build campaign. This disclosure presents methods for layer-by-layer control of heat dissipation in AM techniques to reduce temperature accumulation from previous layers, thereby producing quality parts 24, 24*a* with an acceptable level of defects. The heat dissipation techniques include:

Variable Height-Dependent Interlayer Pause: Achieved through an engineered height-dependent pause between layers to allow dissipation of excess heat and reduce the risk of defects;

Temperature-Graded Inert Gas Control: Engineered control of inert gas temperature as a function of layer height to provide more heat dissipation at upper build layers where elevated temperatures are typically encountered; and Guided Pressurized Cool Inert Gas Control: Introduction of guided pressurized cool inert gas over each build layer at the end of each scan cycle to improve heat dissipation and part quality.

These techniques can be applied with data-driven process control, by selecting an interlayer pause time or guided inert gas temperature based on modeling predictions and real-time sensor data to provide improved process control and adaptability.

The heat dissipation techniques can be applied on a layer-by-layer basis and can be applied individually or combined with any number of other heat dissipation techniques. The disclosed approaches are applicable to any part, build powder material, AM machine, and AM technique. For example, the part can be an aerospace part such as a gas turbine engine part (e.g., cases, combustors, fan section components, compressor section components, turbine section components, tubes, heat exchangers, etc.) or an airplane part (e.g., air cycle machine components, ram air turbine components, gear box components, generator and power distribution system components, flight control and actuation components, cabin components, propeller system components, landing gear components, air data system components, tubes, heat exchangers, etc.). A person of ordinary skill will recognize that the techniques of this disclosure can be used to make a wide variety of parts for other applications as well, including but not limited to various parts and systems for industrial, automotive, marine, and other applications. The build powder can be a metal, polymer, or any other material suitable for use for a selected part and AM technique. The AM technique and corresponding AM machine can be any such AM technique and AM machine that can benefit from use of the disclosed heat dissipation techniques.

Figure 5A:
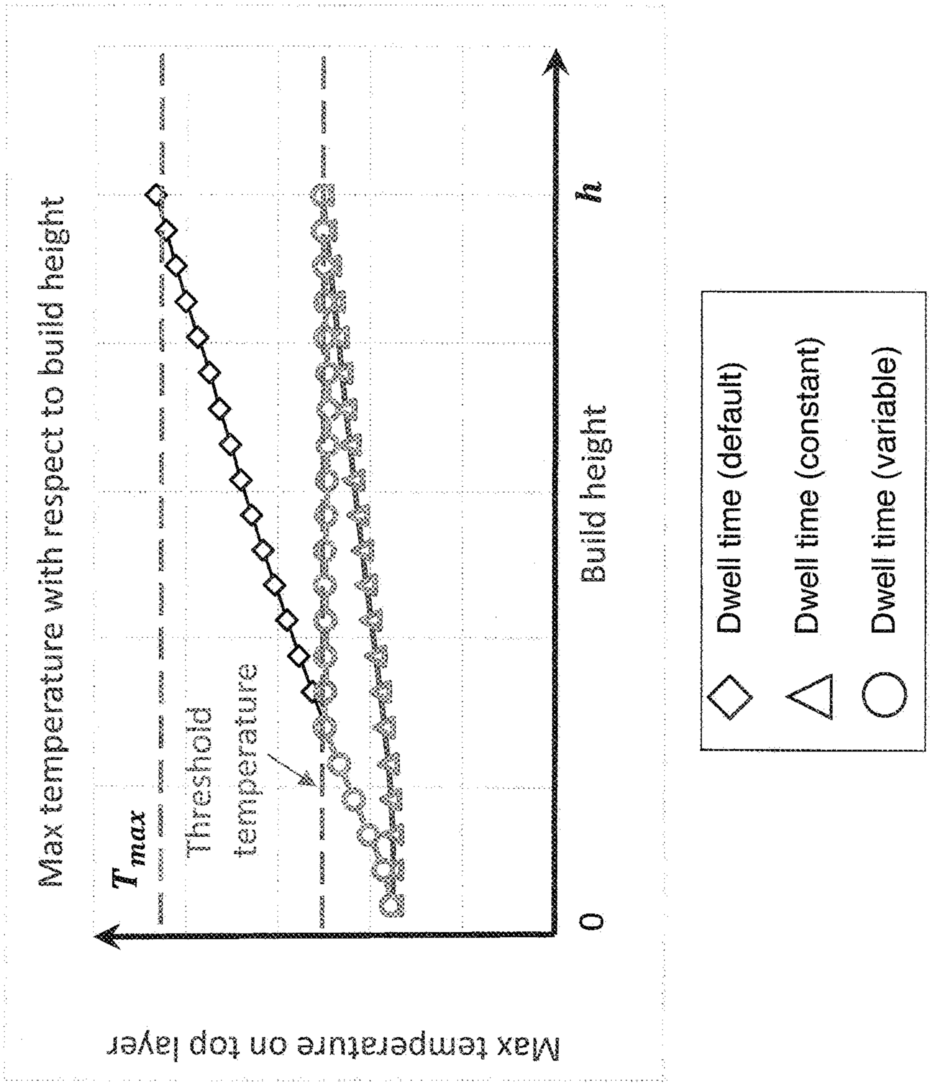
FIG. 5A is graphical representation of temperature on a top layer of parts as a function of build height for three scenarios described in this disclosure.
Figure 5B:
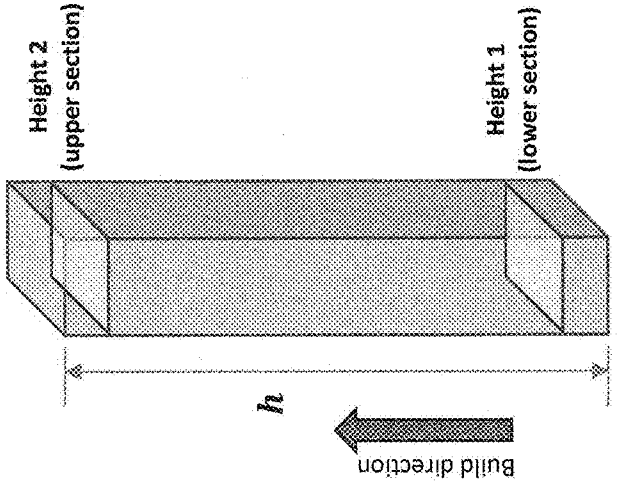
FIG. 5B is a schematic representation of part described in this disclosure showing a first height and a second height.
Figures 1, 5C:
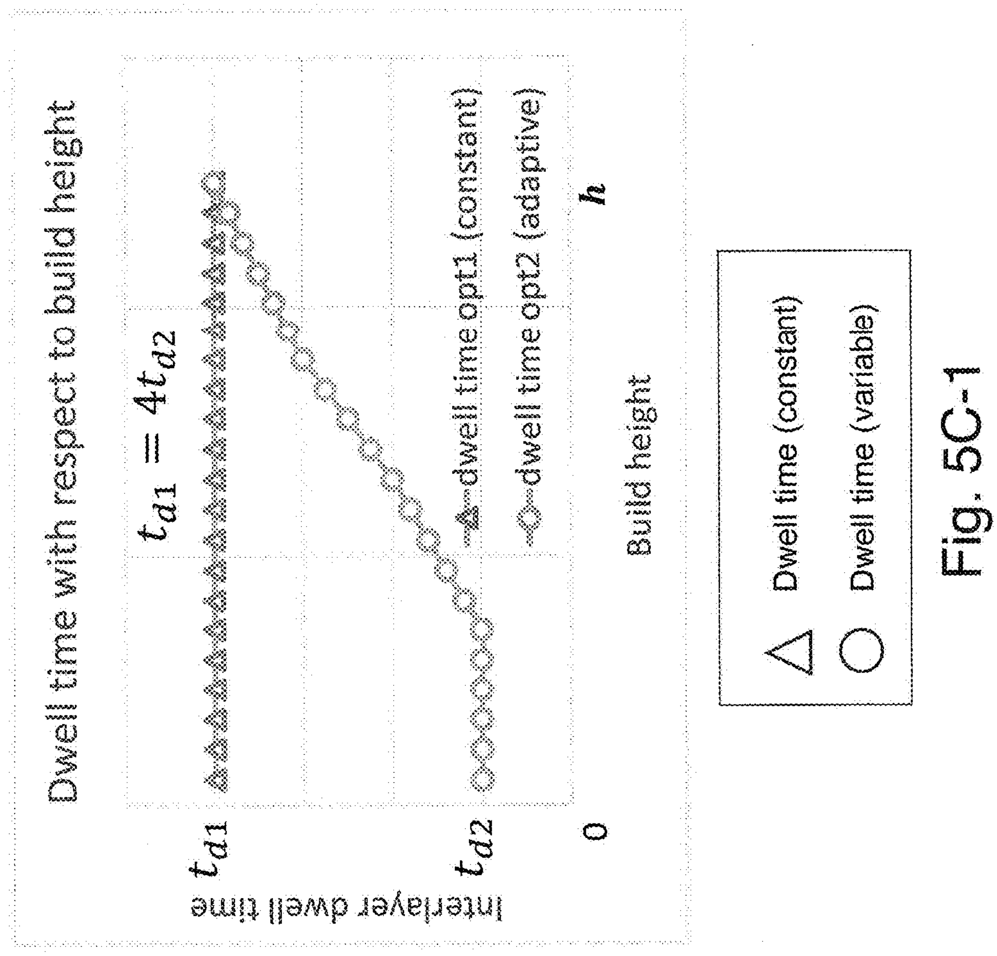
Figures 2, 5C:
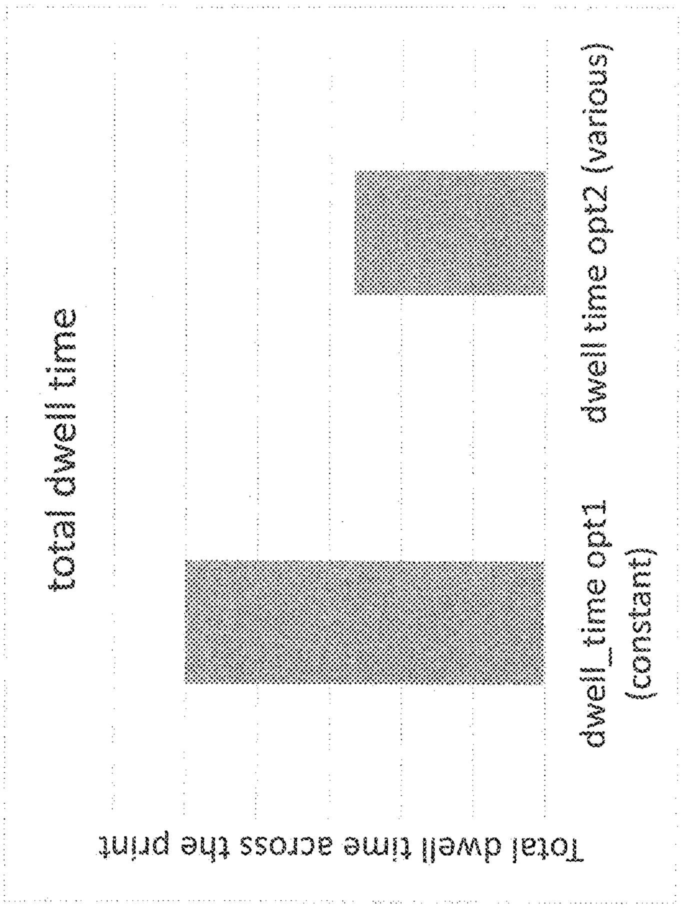

In one example, introduction of a height-dependent pause between layers allows for the dissipation of heat, mitigating the risk of thermal buildup and defects. Separately, or in combination with a height-dependent pause, a variable interlayer pause time provides a dynamic feature that can be selected to reduce print time while maintaining desired part quality. FIGS. 5A to 5C provide an example to illustrate the impact of an interlayer pause for heat dissipation control. FIG. 5A depicts the result of using a constant interlayer dwell time without introducing any pause time (the diamonds in FIG. 5A). As the AM printing process advances upwards, temperature buildup becomes increasingly pronounced, leading to a heightened risk of keyhole defect formation toward the top of the build (see FIG. 5B) as the temperature on top of the build crosses a Threshold Temperature. The Threshold Temperature ($T_{th}$) is the temperature at which keyhole porosity will form deterministically based on considerations of material melting properties, vaporization properties, and other physical properties, as well as the depth and speed of a moving melt pool. The specific value of $T_{th}$ is determined through the use of a complete physics-based analytical model of the process.

FIG. 5A also shows the effectiveness of temperature control via introducing intentional interlayer pauses to keep the temperature buildup below a predefined limit, for example the $T_{th}$. Scenario 1 (the triangles in FIG. 5A) adopts a uniform pause time (i.e., a constant dwell time) for all layers, while scenario 2 (the circles in FIG. 5A) represents a more nuanced approach with a pause scheme that gradually increases from the bottom to the top of the build (see FIG. 5C-1) to reflect the increasing temperature build-up with height. The result in both cases is a controlled thermal environment throughout the AM printing process, reducing the risk of keyhole defect formation by keeping the temperature on top of the build at or below the $T_{th}$. FIG. 5C-2 shows that a gradual increase in interlayer pause time (i.e., interlayer pause time increases with increasing build height) can noticeably reduce total AM print time compared to the constant interlayer pause time, while preserving the same quality in terms of risk of defect formation. In the example of FIG. 5C-2, the total AM print time with a gradual increase in interlayer pause time ("dwell time opt2") is about 47% shorter than the AM print time for a constant interlayer pause time ("dwell time opt1").

It should be noted that the introduced pause describe above can take various forms, ranging from one substantial pause at a specific layer to allow desired cooling, to a gradual increase in interlayer pause time. The determination of the desired strategy can be guided by modeling predictions to reduce the overall AM print time while providing sufficient heat dissipation at every layer.

Figures 6A, 6B, 6C:
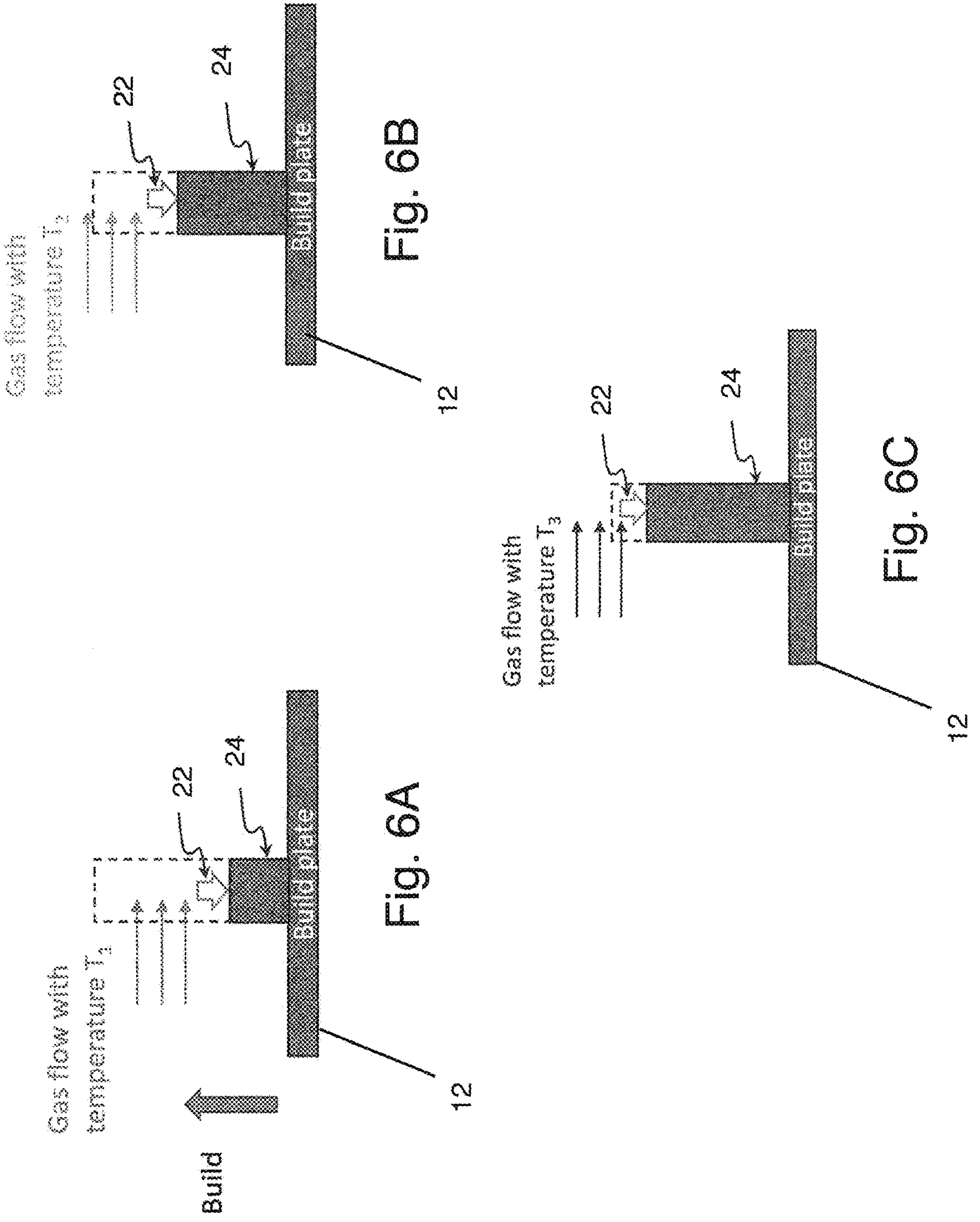
FIGS. 6A-6C are schematic representations of part described in this disclosure depicting inert gas flow with temperatures varying by build height of a part.

FIGS. 6A to 6C show an approach to temperature-graded control of inert gas flowing into the AM machine 10 that includes adjusting the inert gas temperature as a function of layer height to provide a greater amount of heat dissipation at elevated layers. The inert gas can be any gas that does not react with the part 24 or build power bed 20 during the AM process. For example, the inert gas can be nitrogen or another suitable gas. The inert gas can be at any temperature and pressure suitable to provide cooling to the part 24 and build power bed 20 during the AM process.

Figure 7:
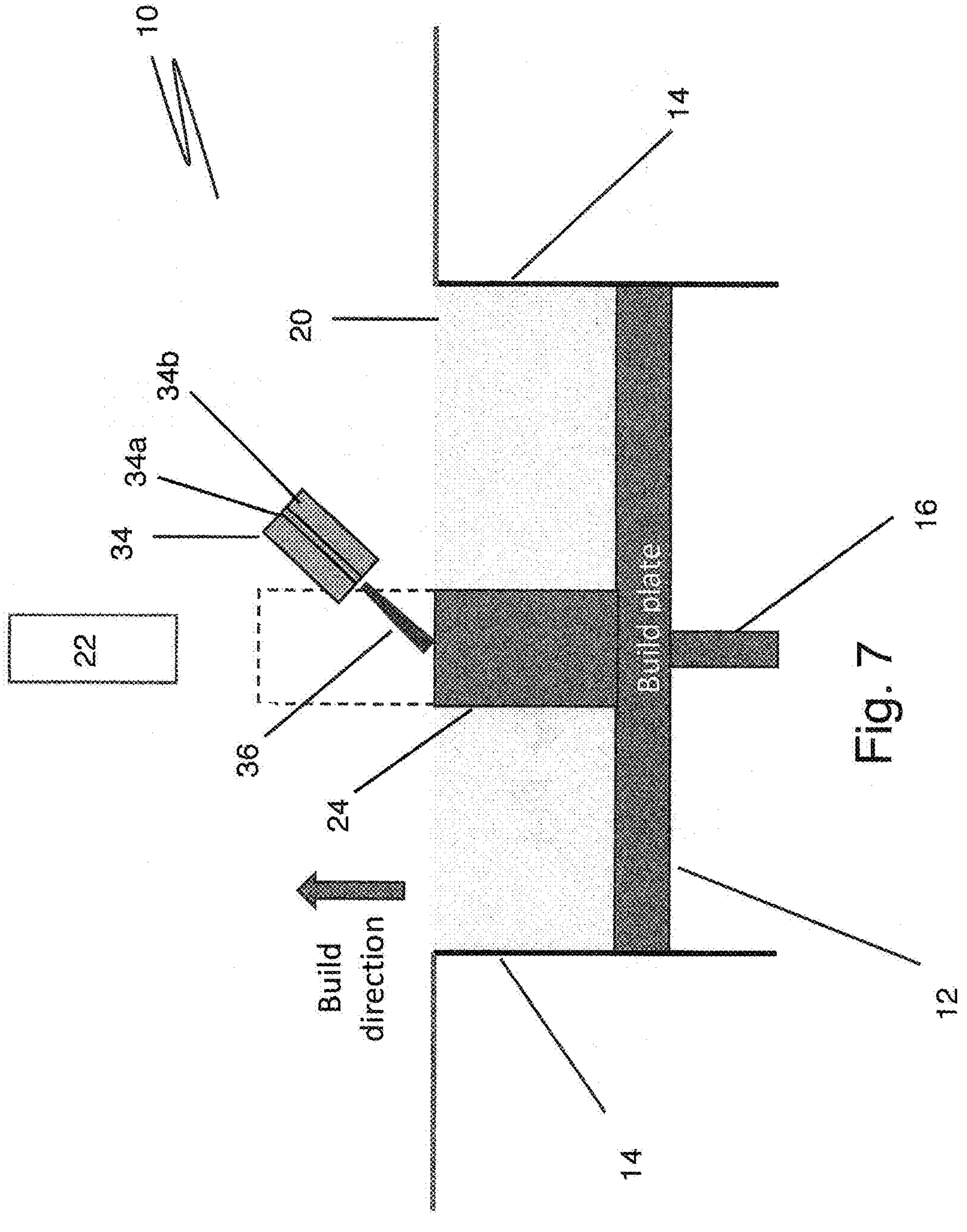
FIG. 7 is a schematic of an additive manufacturing (AM) machine showing a nozzle system for providing pressurized cool inert gas to the top of a part.
Figure 8:
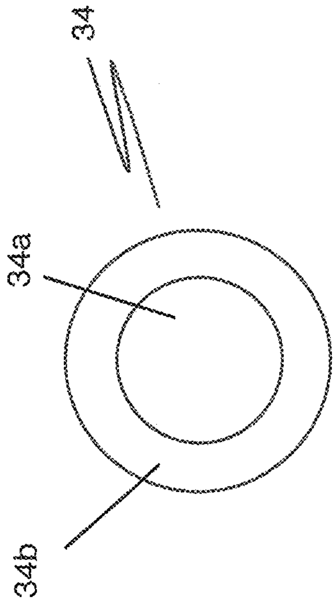
FIG. 8 is a schematic cross-section of a nozzle system for providing cool inert gas to the top of a part.

FIG. 7 shows a different approach that uses guided pressurized cool inert gas flowing over each layer after AM printing to provide controlled cooling by enhancing heat dissipation, contributing to the overall improvement of part quality. FIG. 7 shows a nozzle system 34 that is configured to deliver a controlled and targeted stream 36 of cool inert gas to the top layer of part 24. The nozzle system 34 is positioned adjacent to the top layer of a part 24 in build powder bed 20 and has a dual functionality: first, it emits a precisely directed stream 36 of cool inert gas, and second, it incorporates a gentle suction mechanism (not expressly shown) to avoid disturbing un-sintered build powder particles on the surface of the build powder bed 20. The nozzle system 34 is configured to interface with an AM machine (e.g., a PBF-LB or PBF-EB machine or other AM machine) to apply a heat dissipation technique as discussed above to the one or more parts during performance of an AM technique to mitigate temperature build-up in the one or more parts. FIG. 8 shows that the nozzle system 34 can feature a concentric structure with a central channel 34*a* that releases the cool inert gas in a focused stream with a surrounding outer channel 34*b* that employs a gentle suction to capture any build powder particles displaced from the build powder bed 20. This allows the cool inert gas to be delivered without disturbing the build powder bed 20.

The temperature of the cool inert gas can be selected to provide a desired rate and amount of cooling appropriate for a particular build campaign. The cool inert gas temperature can be altered for different portions of each layer and/or on a layer-by-layer basis as deemed appropriate for a particular build campaign. For example, the selection of interlayer dwell time or inert gas temperature and pressure can be guided by a combination of modeling predictions and real-time sensor data to provide an adaptable, data-driven approach to addressing interlayer temperature build up. The disclosed approaches are applicable any suitable AM technique and to be integrated into any suitable AM system to accommodate diverse build powder compositions, part designs, and AM printing methods.

The method for heat dissipation control that is the subject of this disclosure represents a new approach to addressing the challenge of temperature buildup during AM processes. One focus of the method is to manage heat dissipation layer by layer to allow for production of parts that achieve predetermined quality metrics. The disclosed method can be particularly effective for AM build campaigns directed to tall parts or when interlayer dwell times are relatively short, such as often encountered toward the top of a build. The disclosed method includes various engineered controls, each contributing to the overall improved results from the AM process. As a result, the disclosed method:

- Provides an approach to designing and manufacturing AM parts with an acceptable quality to reduce post-build operations in a production process chain;
- Mitigates the risk of thermal build-up from prior layers that can compromise the structural integrity of the final product;
- Provides a variable interlayer pause time to reduce AM print time without sacrificing quality;
- Provides temperature control of the inert gas to facilitate greater heat dissipation at upper levels of a build where thermal challenges are more pronounced;
- Integrates seamlessly into any AM system or processing method, offering a widely applicable solution applicable across a spectrum of components and materials;
- Reduces thermal stresses in parts build with the disclosed method, reducing the likelihood of warping or distortion in the AM printed parts; and
- Provides consistent and reproducible print quality across variable layers and components in an AM build process.

Discussion of Possible Embodiments

The following are non-exclusive descriptions of possible embodiments of the present invention.

A method of making a part using an additive manufacturing (AM) process including making, with an AM process, one or more parts and applying a heat dissipation technique to the one or more parts during performance of the AM technique to mitigate temperature build-up in the one or more parts. The heat dissipation technique is applied to keep temperature at a top of a part build at or below a Threshold Temperature (Tth), which is a temperature above which keyhole porosity forms in the one or more parts. The heat dissipation technique includes one or more of a variable height-dependent interlayer pause, temperature-graded inert gas control, and guided pressurized cool inert gas.

The method of the preceding paragraph can optionally include, additionally and/or alternatively, any one or more of the following features, configurations and/or additional elements:

The preceding method, wherein the one or more parts are aerospace parts.

The preceding method, wherein the aerospace parts are gas turbine parts

The preceding method, wherein the aerospace parts are airplane parts.

The preceding method, wherein selection of the heat dissipation technique is selected based on modeling predictions and/or real-time sensor data collected during the AM process.

The preceding method, wherein the variable height-dependent interlayer pause includes increasing an interlayer pause time in variable increments for each successive layer from a bottom to a top of a part build, wherein the variable increments are determined based on modeling of the AM process.

The preceding method, wherein the temperature-graded inert gas control includes flowing inert cooling gas over the part and adjusting an inert cooling gas temperature as a function of successive layer height to provide a greater amount of heat dissipation with increasing part height.

The preceding method, wherein the guided pressurized cool inert gas control includes directing cool inert gas toward the part using a cool inert gas nozzle system, wherein the cool inert gas nozzle system comprises a central channel configured to release a stream of cool inert gas and an outer channel configured to use a suction to capture build powder particles displaced by the stream of cool inert gas.

The preceding method, wherein the AM process is laser powder bed fusion (PBF-LB) or electron beam powder bed fusion (PBF-EB).

A cool inert gas nozzle system for use in an AM process. The cool inert gas nozzle system includes a central channel configured to release a stream of cool inert gas and an outer channel configured to use a suction to capture build powder particles displaced by the stream of cool inert gas.

The cool inert gas nozzle system of the preceding paragraph can optionally include, additionally and/or alternatively, any one or more of the following features, configurations and/or additional elements:

The preceding cool inert gas nozzle system, wherein the AM process is laser powder bed fusion (PBF-LB) or electron beam powder bed fusion (PBF-EB).

The preceding cool inert gas nozzle system, wherein the cool inert gas nozzle system is configured to interface with an AM machine to apply a heat dissipation technique to the one or more parts during performance of an AM technique to mitigate temperature build-up in the one or more parts, wherein the heat dissipation technique is applied to keep temperature at a top of a part build at or below a Threshold Temperature ($T_{th}$).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of making a part using an additive manufacturing (AM) process, comprising:

making, with an AM process, one or more parts; and applying a heat dissipation technique to the one or more parts during performance of the AM technique to mitigate temperature build-up in the one or more parts, wherein the heat dissipation technique is applied to keep temperature at a top of a part build at or below a Threshold Temperature ($T_{th}$);

wherein the Threshold Temperature ($T_{th}$) is a temperature above which keyhole porosity forms in the one or more parts;

wherein the heat dissipation technique includes a temperature-graded inert gas control that includes flowing inert cooling gas over the part and adjusting an inert cooling gas temperature as a function of successive layer height to provide a greater amount of heat dissipation with increasing part height.

2. The method of claim 1, wherein the one or more parts are aerospace parts.

3. The method of claim 2, wherein the aerospace parts are gas turbine parts.

4. The method of claim 2, wherein the aerospace parts are airplane parts.

5. The method of claim 1, wherein selection of the heat dissipation technique is selected based on modeling predictions and/or real-time sensor data collected during the AM process.

6. The method of claim 1, wherein the variable height-dependent interlayer pause includes increasing an interlayer pause time in variable increments for each successive layer from a bottom to a top of a part build, wherein the variable increments are determined based on modeling of the AM process.

7. The method of claim 1, wherein a guided pressurized cool inert gas control includes directing cool inert gas toward the part using a cool inert gas nozzle system, wherein the cool inert gas nozzle system comprises a central channel configured to release a stream of cool inert gas and an outer channel configured to use a suction to capture build powder particles displaced by the stream of cool inert gas.

8. The method of claim 1, wherein the AM process is laser powder bed fusion (PBF-LB) or electron beam powder bed fusion (PBF-EB).

9. The method of claim 1, wherein:

the one or more parts comprise at least a first part having a first height and a second part having a second height and the second height is less than the first height;

the heat dissipation technique includes at least a variable height-dependent interlayer pause and the height-dependent interlayer pause for a layer including both the first part and the second part is longer than the height-dependent pause for a layer including only the first part.

10. A cool inert gas nozzle system for use in an AM process, wherein the cool inert gas nozzle system comprises:

a central channel configured to release a stream of cool inert gas; and an outer channel configured to use a suction to capture build powder particles displaced by the stream of cool inert gas;

wherein the cool inert gas nozzle system is configured to interface with an AM machine to apply a heat dissipation technique to the one or more parts during performance of an AM technique to mitigate temperature build-up in the one or more parts, wherein the heat dissipation technique is applied to keep temperature at a top of a part build at or below a Threshold Temperature ($T_{th}$) by applying a temperature-graded inert gas control including flowing inert cooling gas over a part and adjusting an inert cooling gas temperature as a function of successive layer height to provide a greater amount of heat dissipation with increasing part height.

11. The cool inert gas nozzle system of claim 10, wherein the AM process is laser powder bed fusion (PBF-LB) or electron beam powder bed fusion (PBF-EB).

12. The method of claim 1, wherein the heat dissipation technique further includes one or both of a variable height-dependent interlayer pause and guided pressurized cool inert gas.

13. The cool inert gas nozzle system of claim 10, wherein the heat dissipation technique further includes one or both of a variable height-dependent interlayer pause and guided pressurized cool inert gas.

* * * * *